(12) United States Patent
Ganiere (10) Patent No.: US 8,059,272 B2
(45) Date of Patent: Nov. 15, 2011

(54) TIME-RESOLVED SPECTROSCOPIC MEASUREMENT APPARATUS

(75) Inventor: Jean-Daniel Ganiere, Mex (CH)

(73) Assignee: École Polytechnique Fédérale de Lausanne, Lausanne (CH)

( * ) Notice: Subject to any disclaimer, the term of this patent is extended or adjusted under 35 U.S.C. 154(b) by 0 days.

(21) Appl. No.: 11/662,680

(22) PCT Filed: Sep. 16, 2005

(86) PCT No.: PCT/EP2005/010002
§ 371 (c)(1),
(2), (4) Date: Jun. 13, 2007

(87) PCT Pub. No.: WO2006/029890
PCT Pub. Date: Mar. 23, 2006

(65) Prior Publication Data
US 2008/0074664 A1    Mar. 27, 2008

Related U.S. Application Data

(60) Provisional application No. 60/611,160, filed on Sep. 18, 2004.

(51) Int. Cl.
*G01J 3/28* (2006.01)

(52) U.S. Cl. ...................................................... 356/328

(58) Field of Classification Search .................. 356/328; 359/232, 234; 348/215.1
See application file for complete search history.

(56) References Cited

U.S. PATENT DOCUMENTS

| | | | |
|---|---|---|---|
| 3,508,813 A | | 4/1970 | Smith, Jr. et al. |
| 3,634,695 A | * | 1/1972 | Barringer ...................... 250/550 |
| 3,700,331 A | * | 10/1972 | White ........................... 356/308 |
| 4,492,121 A | | 1/1985 | Lehto et al. |
| 5,629,524 A | * | 5/1997 | Stettner et al. ............ 250/370.09 |
| 6,804,001 B1 | * | 10/2004 | Leroux ........................... 356/326 |
| 2003/0184748 A1 | * | 10/2003 | McCarthy ..................... 356/328 |
| 2004/0031906 A1 | | 2/2004 | Glecker |
| 2004/0150817 A1 | * | 8/2004 | Smith et al. ................... 356/301 |

FOREIGN PATENT DOCUMENTS

| | | |
|---|---|---|
| DE | 198 33 356 A1 | 1/2000 |
| GB | 2141004 A | 12/1984 |

* cited by examiner

*Primary Examiner* — Tarifur Chowdhury
*Assistant Examiner* — Abdullahi Nur
(74) *Attorney, Agent, or Firm* — Saliwanchik, Lloyd & Eisenschenk (57) ABSTRACT

Light dispersing device comprising a slit element having a slit for exposure to electromagnetic radiation, wherein the slit element is configured and disposed for turning the slit between at least two positions. The light dispersing device is used together with a streak camera, whereby in a first position the slit is adjusted to influence the temporal resolution of the streak camera and in a second postion the slit is adjusted to influence the spectral resolution of the streak camera.

23 Claims, 6 Drawing Sheets

TIME-RESOLVED SPECTROSCOPIC MEASUREMENT APPARATUS

CROSS-REFERENCE TO RELATED APPLICATIONS

This application is the U.S. National Stage Application of International Patent Application No. PCT/EP2005/010002, filed Sep. 16, 2005, which claims priority to U.S. Provisional Application Serial Number 60/611,160, filed Sep. 18, 2004, both of which are hereby incorporated by reference herein in their entirety, including any figures, tables, or drawings.

The present invention relates to a time-resolved spectroscopic measurement apparatus and, in particular, to streak cameras and optical dispersive devices for a use with streak cameras in the visible part of the electromagnetic spectrum.

Streak cameras are a convenient and fast means used in physical and chemical applications to detect temporally resolved optical spectra with a temporal resolution down to less than one picosecond.

Figure 1:
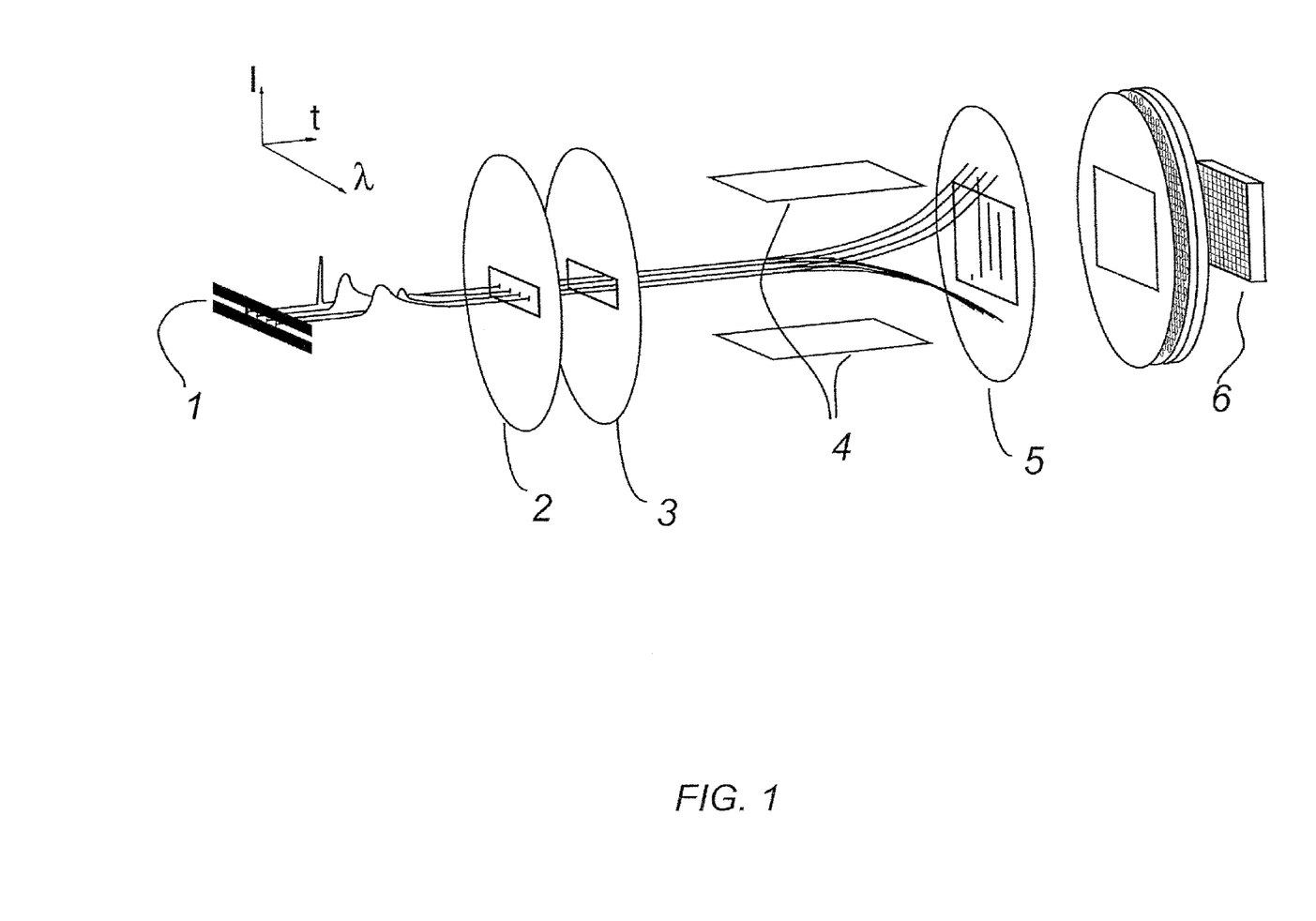
FIG. 1 is a perspective exploded view of a conventional prior art streak camera.
Figure 2:
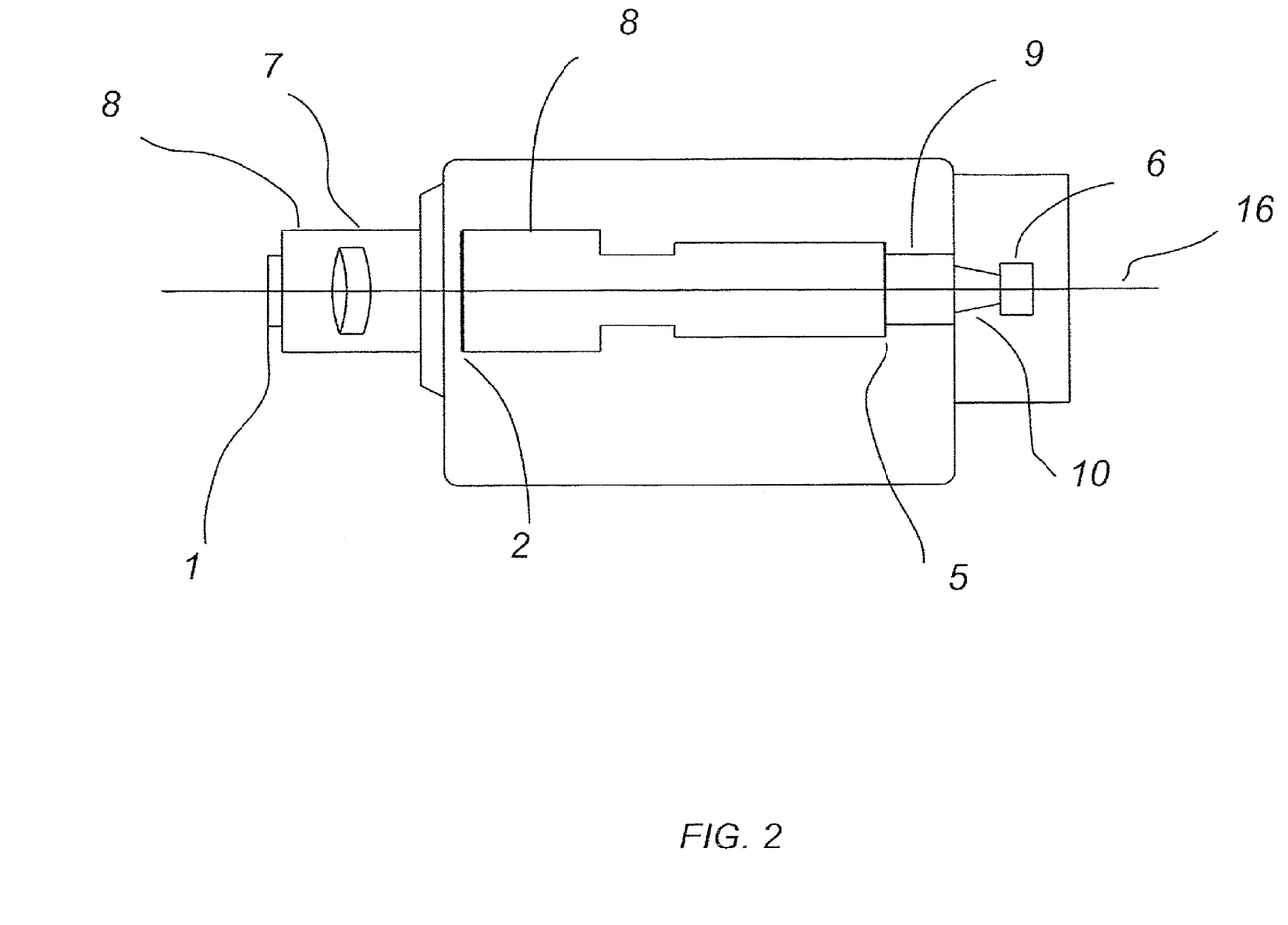
FIG. 2 is a cross-sectional top plan view of the streak camera of FIG. 1.

Compared to other time-resolved measurement systems streak cameras allow an instantaneous temporal analysis of an optical signal beam. An example of a conventional streak camera is schematically shown in FIG. 1. An optical signal entering a slit 1 impinges on a photocathode 2 which emits electrons that are accelerated by means of a biased extraction plate 3. Depending on a timely-varying voltage applied to deflection plates 4, the electrons are deflected by an amount which varies as a function of the point in time of their generation at the photocathode 2. The positions of the electrons impinging on a phosphor screen 5 that collects the electrons represent an image of the temporal evolution of the intensity of the original optical signal. The image generated on the phosphor screen 5 is detected and stored by means of a CCD 6.

The signal entering the slit 1 can be a monochromatic signal or a polychromatic signal including spectral information. In order to obtain an image including both temporal and spectral information of an electromagnetic signal a light dispersing device such as a spectrometer must be provided in the optical path upstream of the streak camera. The dispersing device spreads a polychromatic spot focussed on its (usually vertically oriented) entrance slit into a (usually horizontally oriented) spectral line which then enters the temporal slit 1 of the streak camera. Here, slit 1 of the streak camera will be denoted as a "temporal slit", since the temporal resolution of the streak camera can be directly affected by the width of the slit 1 (which in turn influences the height of the spectral line entering the streak camera). In addition a conventional streak camera includes input optics 7, an image converter 8, an image intensifier 9 and an optical converter 10.

Figure 3:
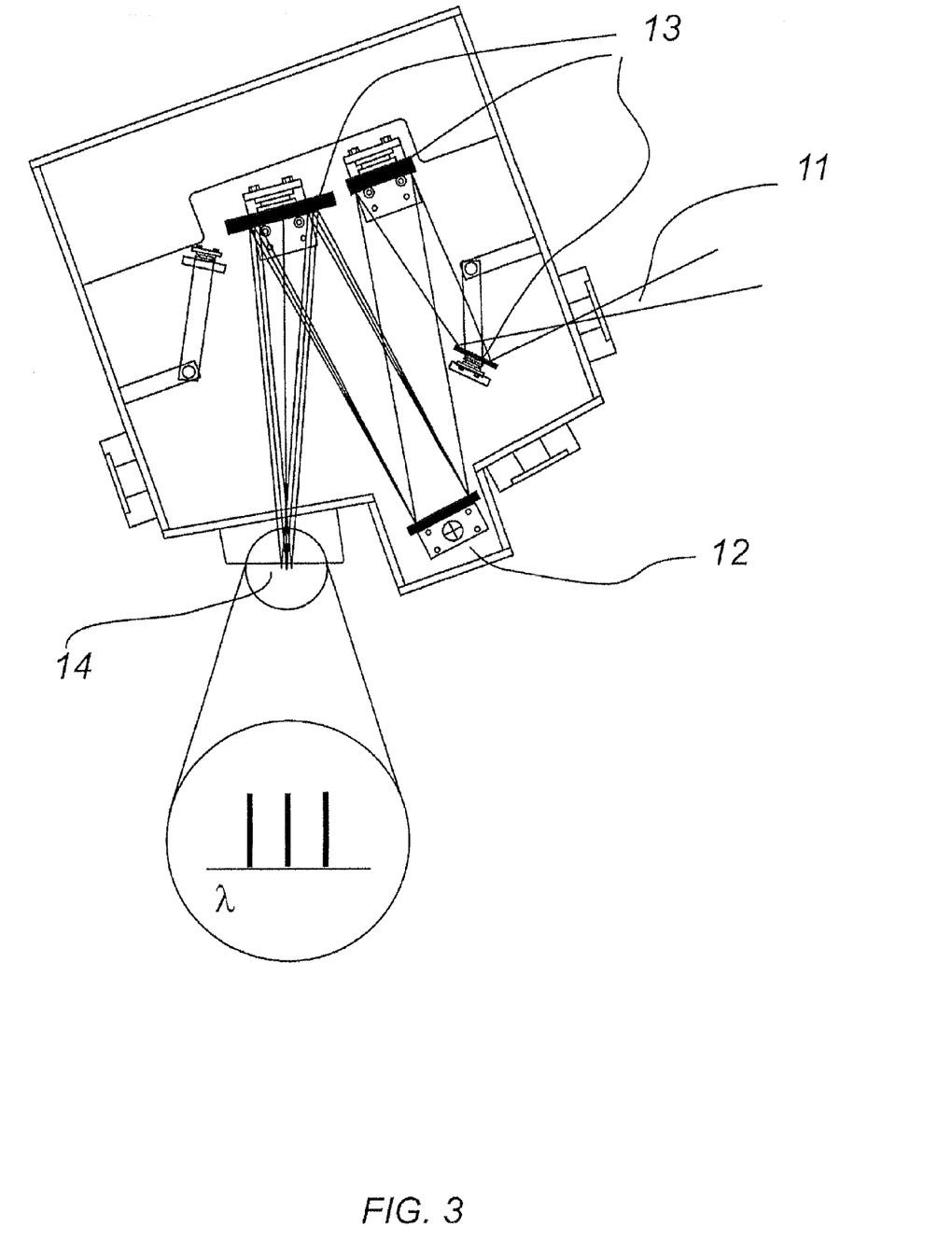
FIG. 3 is a cross-sectional top plan view of a prior art spectrometer of the Czerny-Turner type.

In many cases, the spectrometers used in combination with streak cameras are of the Czerny-Turner-type. An example of such a spectrometer is shown in FIG. 3. Spectrometers of this type include an entrance slit 11, a reflective grating 12 and additional mirror optics 13 for defining an optical path through the spectrometer. These spectrometers a typically designed for a use in a wide spectral range (0.2 μm-20 μm) and are equipped with mirror optics 13 which are achromatic.

Theoretically, the intrinsic resolution of a grating 12 used in such a spectrometer is given by the well-known formula:

$$\frac{\lambda}{\Delta\lambda} = k \cdot N \quad (1.1)$$

where k is the diffraction order and N is the total number of grooves diffracting the light.

The associated Fourier transform limited temporal broadening as a consequence of the principle of Heisenberg is given by:

$$\Delta\tau \leq \frac{k \cdot N \cdot \lambda}{c} \quad (1.2)$$

For usual spectrometers (having e.g. a focal length of about 25-30 cm and a grating of about 60×60 mm including 1200 grooves/mm) the theoretical resolution using the first order of the grating is given by:

$$\frac{\lambda}{\Delta\lambda} = N = 60 \times 1200 = 72'000 \quad (1.3)$$

The corresponding temporal broadening is given by:

$$\Delta\tau \leq \frac{72000 \cdot 0.8 \times 10^{-6}}{3 \times 10^8} = 192 \, \text{ps}. \quad (1.4)$$

However, the effective resolution is committed by the aberration of the mirror optics, the width of the entrance and exit slits.

Due to the different wavelengths included in the spectral line (corresponding to the spread optical entrance signal) obtained at the exit of the spectrometer, the plane 14 at which the entrance of the streak camera is arranged is slightly tilted with respect to a plane perpendicular to the axis defined by the central wavelength as is understood by the person skilled in the art. However, this plane 14 does not correspond to the best optical resolution (of i.e. a plane in which the exit slit of a monochromator would be placed), but presents a compromise, i.e. a plane which makes it possible to obtain an acceptable resolution in the entire range of the spread optical spectrum.

Figure 4:
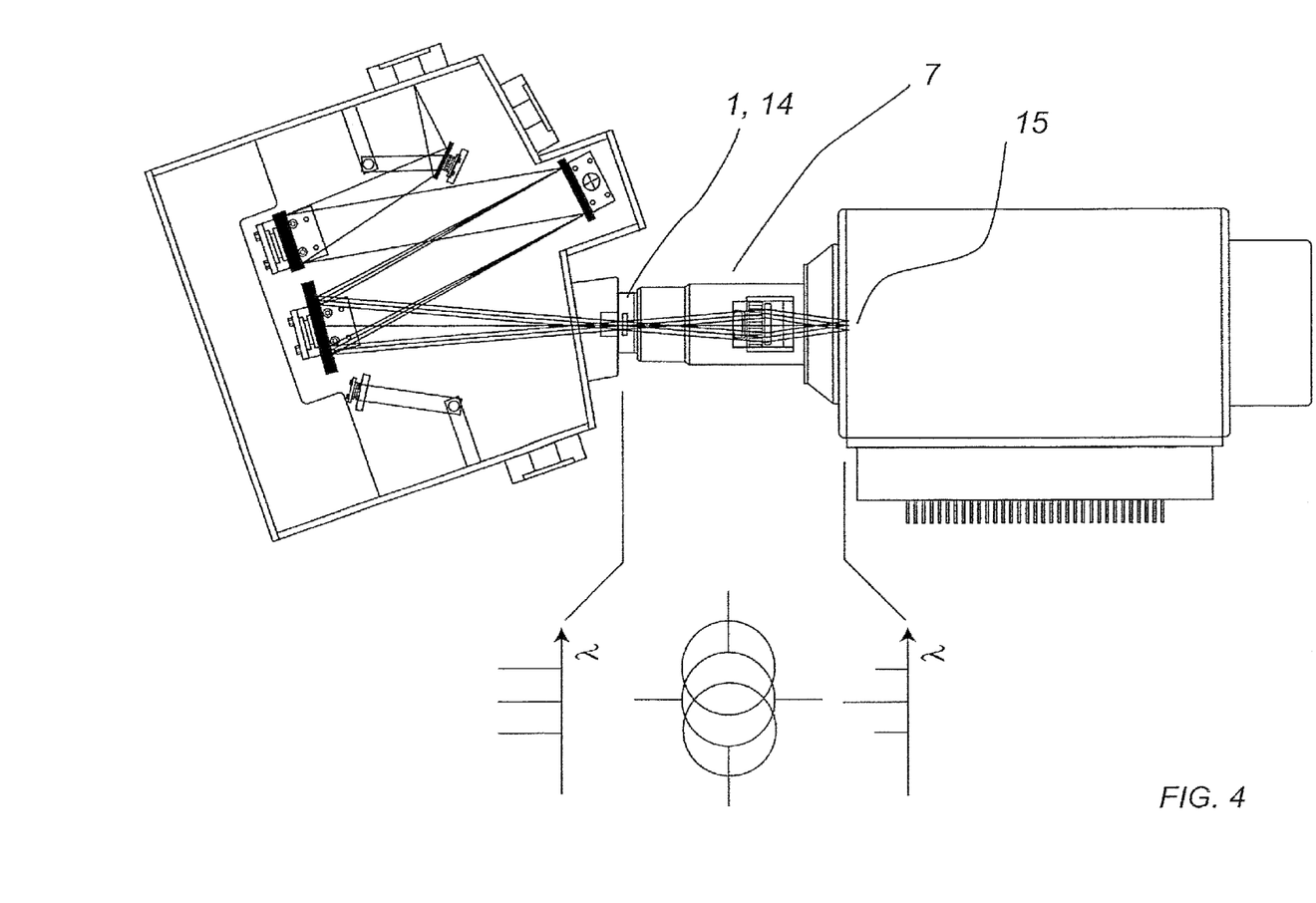
FIG. 4 is a cross-sectional view top plan view of an arrangement including a conventional streak camera and a spectrometer of the Czerny-Turner type.
Figure 5:
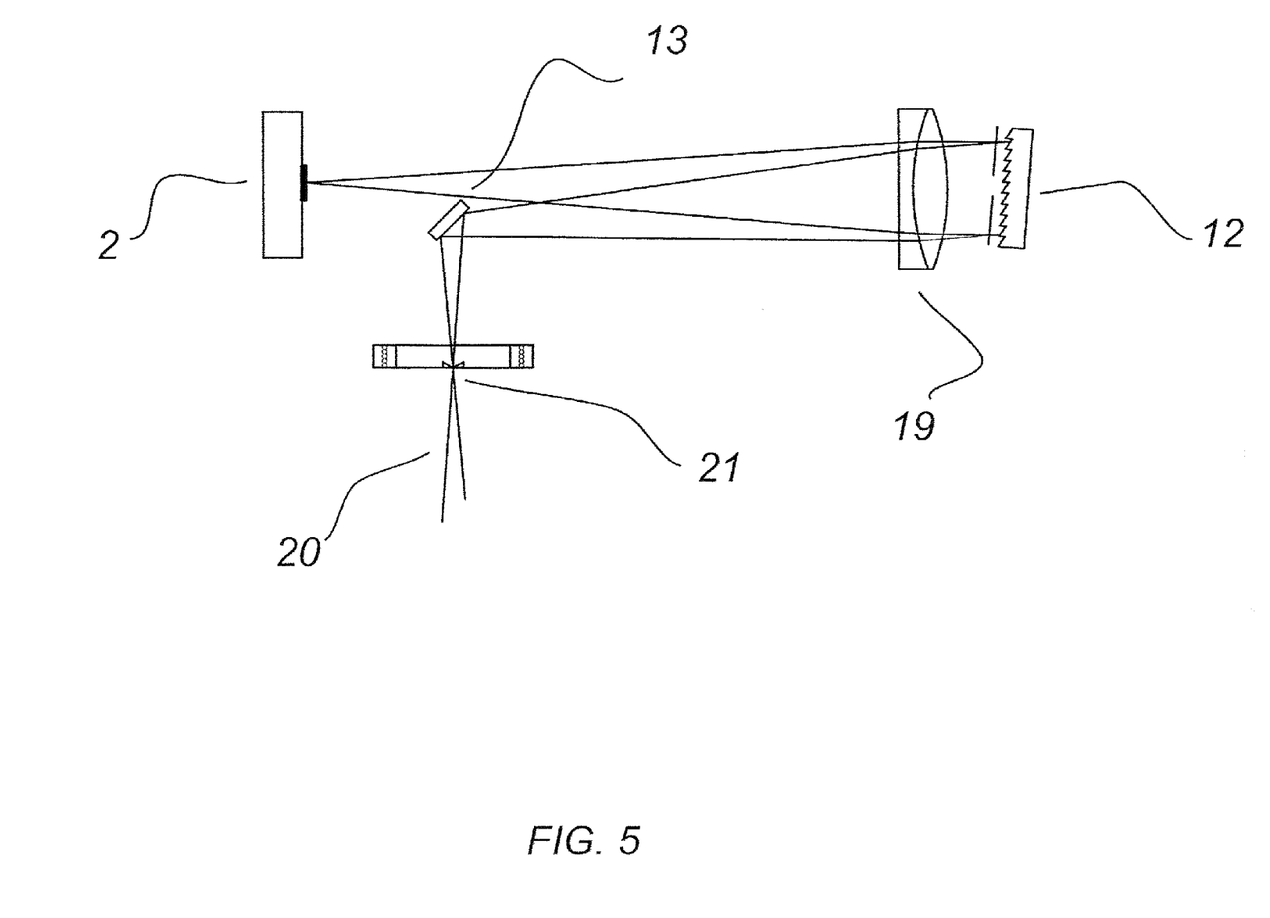
FIG. 5 is a schematical view of a spectrometer having a Littrow-configuration.

Moreover, in conventional streak camera systems the temporal slit 1 of the streak camera is placed in the exit plane of the spectrometer and the temporal slit 1 is imaged by means of a photographic objective 7 on the photocathode 2 of the streak camera as is schematically shown in FIG. 4.

The fact that the temporal slit is not arranged in a plane perpendicular to the direction defined by the central wavelength deteriorates the spectral and temporal resolution of the signal detected by the streak camera. The use of a photographic objective 7 to image the temporal slit 1 on the photocathode 2 is also disadvantageous, since in principle only the part of the spectral line propagating on the central axis 16 through the photographic objective 7 is optimally imaged on the photocathode 2 of the streak camera, while the spectral resolution and the optical throughput deteriorate with increasing distance from the axis 16 due to the limited numerical aperture of the photographic objective 7.

It is the object of the present invention to provide a time-resolved spectroscopic apparatus having an improved spectral and temporal resolution without increased technical complexity.

This achieved by a light-dispersing device having a slit element having a slit for exposure to electromagnetic radiation, where the slit element is configured and disposed for turning the slit between at least two positions, a streak camera apparatus including such a light dispersing device and a method for detecting a temporally resolved electromagnetic spectrum with such a streak camera.

According to the present invention, a light dispersing device such as a spectrometer or a monochromator is provided which comprises a slit element including a slit for exposure to electromagnetic radiation. The slit element is configured and disposed for turning the slit between at least two positions and thus has functionalities of both a "temporal" and a "spectral" slit. Here, the expression "spectral" slit is to be understood as a slit (usually having a vertical orientation with respect to a surface supporting the light dispersing device) that influences the spectral resolution of an optical signal e.g. in a light dispersing device (Reducing the entrance slit width of a light dispersing device increases its spectral resolution), while "temporal" slit denotes a slit (usually having a horizontal orientation with respect to a surface supporting the streak camera) influencing the temporal resolution of a streak camera. Thus, the light dispersing device according to the present invention includes a slit element that can be adjusted in two different slit positions and thus corresponds to two slits positioned at the same optical plane which can be used both as a temporal slit influencing the temporal resolution of the streak camera (of the light dispersing device), and as a spectral slit influencing the spectral resolution of the streak camera.

In addition to a simplified configuration of the streak camera apparatus, due to the fact that the slit element includes two slit positions and thus replaces two conventional slits in the spectrometer and in the streak camera, respectively, the present invention permits to directly place the photocathode of a streak camera at the exit plane of the spectrometer (which is conjugated to its entrance slit) and avoids the use of any imaging means such as a photographic objective. Accordingly, the temporal and spectral resolution of the streak camera can be improved.

According to a preferred embodiment, the first and the second positions of the slit element are orthogonal to each other. This permits the use of the slit both as a temporal slit influencing the temporal resolution of the streak camera as well as a spectral slit influencing the spectral resolution of an optical signal entering the spectrometer through the slit.

In order to minimize aberrations in the spectrometer, a Littrow optical path configuration is preferred in the spectrometer. In a Littrow configuration the angle of incidence and the defraction angle are almost identical. Since aberrations can be minimized to the greatest extent by a Littrow configuration the spectral and temporal resolution of the streak camera apparatus is improved.

According to another preferred embodiment, the light dispersing device includes at least one reflective grating and an optical configuration wherein the difference between the angle of incidence on the grating and the angle of defraction is smaller than 10°, and preferably smaller than 5°.

According to a further embodiment the slit element of the light dispersing device is arranged at its entrance side. However, configurations including several slit elements can also be conceived.

According to the present invention, also a streak camera apparatus is provided that includes a light dispersing device according to the present invention as defined above.

According to a preferred embodiment, the exit side image plane of the light dispersing device (which is optically conjugated to the entrance slit plane) is directly positioned on the photocathode of the streak camera. Thus the use of a photographic objective to image the temporal slit of the streak camera on the photomultiplier tube of the streak camera can be avoided and the temporal and spectral resolution is significantly improved in the range outside the axis defined by the central wavelength.

According to another preferred embodiment, the slit can be adjusted in a first "temporal" position in which the temporal resolution of the streak camera apparatus can be influenced and in a second "spectral" position in which the spectral resolution of the streak camera apparatus can be influenced. The second "spectral" position is preferably used for alignment purposes of an optical system including the streak camera and the light dispersing device.

According to a further embodiment, the streak camera apparatus may include a temporal reference means preferably comprising an optical delay line. The reference can be used for temporal readjustments of spectra, e.g. to compensate for slow drifts in the system.

Moreover, a method for detecting a temporally resolved electromagnetic spectrum with a streak camera apparatus according to the present invention is provided. It includes the steps of positioning the slit element in a first position in which the slit is adjusted to affect the spectral resolution of the streak camera apparatus (of the light dispersing device connected therewith), focussing electromagnetic radiation on the slit, positioning the slit element in a second position in which the slit is adjusted to affect the temporal resolution of the streak camera apparatus and adjusting the focussing of the electromagnetic radiation (e.g. an optical signal) on the slit according to the desired temporal resolution. Subsequently, a measurement can be carried out. The method permits to obtain an optimum adjustment of a streak camera system and thus to obtain a very high spectral and temporal resolution while the use of a photographic objective to image the temporal slit on the photocathode can be avoided.

Furthermore, the method can include the aligning of the streak camera apparatus with respect to electromagnetic radiation or components of an optical setup in at least one of the positions of the slit element or the changing of the width of the slit of the slit element to influence the temporal or spectral resolution of the streak camera apparatus.

Further aspects and objects of the present invention will result from the following description of a preferred embodiment of the invention in conjunction with accompanying drawings, in which:

Figure 6:
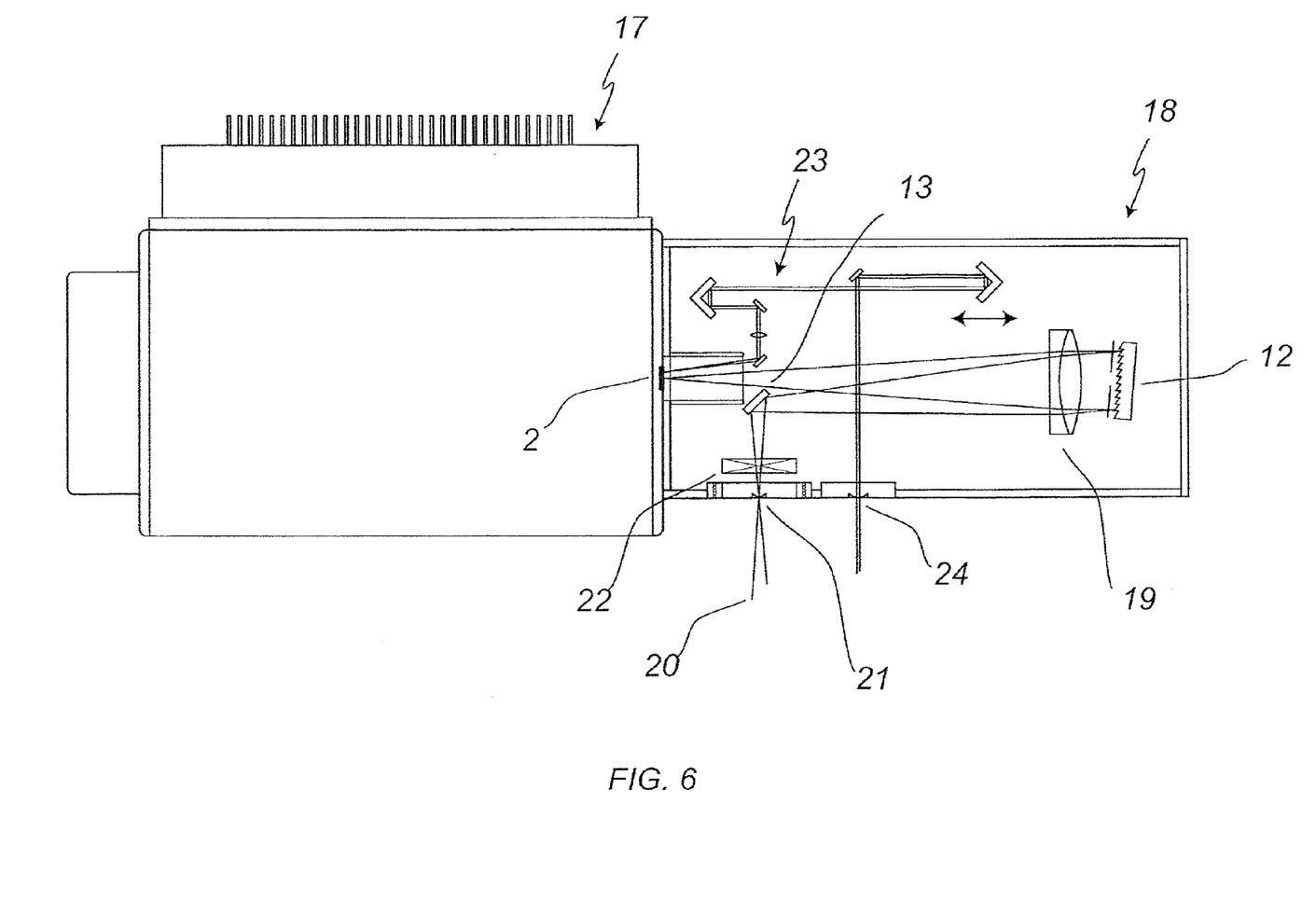
FIG. 6 is a cross-sectional view of a streak camera arrangement according to the present invention.

FIG. 6 shows an example of a time-resolved spectroscopic measurement apparatus according to the present invention including a streak camera 17 and a spectrometer 18. The spectrometer 18 comprises an optical path arrangement according to the Littrow-configuration. It comprises a grating 12 and an achromatic lens 13 in front of the grating 12. In the present case an achromatic lens 13 with a focal length of about f=30 cm is used. However, this particular lens merely represents an example and obviously lenses having other focal lengths can also be used. Furthermore, the spectrometer includes a slit element 21 including a slit which can be adjusted in at least two orthogonal positions. An optical signal 20 (e.g. originating from a specimen) focused on the slit of slit element 21 enters the spectrometer 18 via a shutter 22 and impinges on a mirror 13 which deflects the signal through the lens 13 on the grating 12. The signal deflected by the grating 12 is subsequently reflected onto the photocathode 2 of the streak camera 17 and thereby again traverses the lens 13. The optical path in a spectrometer having a Littrow configuration is shown in more detail in FIG. 4. In FIG. 4 the reflective structure of the grating 12 is visible. The streak camera 17 includes a conventional design as shown in FIG. 1, however no photographic objective 7 or temporal slit.

Due to the Littrow-configuration of the optical path in the spectrometer the total angle of deviation between the incident and reflected signals is close to zero. Since all light beams propagate very close to the optical axis of the lens 13 and the grating 12, the spherical aberrations are restricted to a minimum. A polychromatic optical signal focused on the slit element 21 of the spectrometer 18 is dispersed by the grating 12 and appears as a spectral line at the exit plane of the spectrometer 18 which coincides with the photocathode 2 of the streak camera 17.

In one of the positions (in FIG. 6, the position in which the slit 3 is parallel to the drawing plane) the rotatable slit element 21 serves as a "temporal" slit for the streak camera 1. In this position the temporal resolution of the streak camera is directly related to the width of the slit. As the temporal slit is positioned at the entrance of the spectrometer 18 and not in front of the streak camera 17 as in conventional devices no photographic objective must be provided to image the spectral line on the photocathode 2.

Without a photographic objective and by using a spectrometer 18 comprising a Littrow-configuration, a significantly improved temporal and spectral resolution can be achieved. Using a grating of 5×5 cm which comprises 1200 grooves/mm, a spectral resolution of more than $\lambda/\Delta\lambda=10,000$ is obtained. With a grating which comprises 600 grooves/mm, a resolution of more than 5,000 can be achieved.

In the present embodiment the slit element 21 is configured as a rotatable member permitting two orthogonal slit positions at the same optical plane. However, other designs of the slit element can also be conceived.

In an exemplary alignment procedure of an optical measurement setup including the described embodiment of the time-resolved spectroscopic measurement apparatus according to the present invention an optical beam 20 is initially focused on the slit element 21 of the spectrometer 18 in the "spectral" slit position (in FIG. 6, the position perpendicular to the drawing plane). In this position the optical alignment of the spectrometer and the camera with respect to the optical beam and the remainder of the set up can be carried out as is understood by the person skilled in the art. Once this alignment is completed and an optimum focussing is obtained, the slit is opened to a width which is slightly larger than the size of the spot of the focused signal beam to maximize the flow through the optical system. In the exit plane of the spectrometer 18 or on the photocathode 2 of the streak camera 17, respectively, a line-shaped signal is observed (if the original signal is polychromatic) including dispersed monochromatic images having a width identical to the size of the spot focused on the entrance slit (provided the system does not show any anamorphisms).

Then the slit element is turned into the orthogonal position (in FIG. 6, the slit is parallel to the drawing plane in the orthogonal position) and the slit is closed, to check whether the temporal broadening of the signal changes or improves. Eventually, a further alignment of the beam will be carried out in consequence of this test to change the temporal resolution. (which can also influence the spectral resolution to which it is related according to formula 1.2). When a correct or desired alignment is achieved a measurement can be conducted depending on the case with a slightly closed or even an open slit.

The spectrometer optionally includes a delay line 23 as a temporal reference in the optical system and a further entrance slit 24 for a reference signal. The reference signal can be used for temporal readjustments of the spectrum in order to compensate slow drifts and to increase the dynamics of the system. Furthermore, the reference signal preferably including a laser can be used to temporally calibrate the streak camera.

The features disclosed in the description, the claims and the drawings can be of importance for the present invention either alone or in any combination thereof.

REFERENCE NUMERALS

1. Temporal slit
2. Photocathode
3. Extraction plate
4. Deflection plates
5. Phosphor screen
6. CCD
7. Input optics
8. Image converter
9. Image intensifier
10. Optical converter
11. Entrance slit
12. Reflective grating
13. Mirror optics
14. Plane
15. Conjugated plane of the photocathode
16. Central axis
17. Streak camera
18. Spectrometer
19. Achromatic lens
20. Optical signal
21. Slit element
22. Shutter
23. Delay line
24. Slit

The invention claimed is:

1. A device, comprising:
   a light dispersing element dispersing electromagnetic radiation perpendicular to an axis defined by the light dispersing element; and
   a slit element, the slit element having a slit for exposure to electromagnetic radiation, wherein the slit element is configured and disposed for turning the slit between at least two positions with respect to the axis defined by the light dispersing element such that each of a corresponding at least two portions of the electromagnetic radiation pass through the slit when the slit is in each of the corresponding at least two positions,
   wherein the slit element is arranged such that each of the corresponding at least two portions of the electromagnetic radiation that pass through the slit travels along an optical axis and is dispersed by the light dispersing element after passing through the slit,
   wherein the corresponding at least two portions of the electromagnetic radiation are transferred from the slit to the light dispersing element without any relative rotation around the optical axis between the corresponding at least two portions of the electromagnetic radiation.

2. The device of claim 1, wherein the at least two positions include a first position and a second position wherein the first and the second positions of the slit are orthogonal to each other such that a first portion of the electromagnetic radiation passes through the slit when the slit is in the first position and a second portion of the electromagnetic radiation passes through the slit when the slit is in the second position.

3. The device of claim 2, wherein the light dispersing device comprises an optical path having a Littrow configuration.

4. The device of claim 2, further comprising:
at least one reflective grating and an optical configuration wherein the difference between the angle of incidence on the grating and the angle of diffraction is smaller than 10°.

5. The device of claim 2, further comprising:
at least one reflective grating and an optical configuration wherein the difference between the angle of incidence on the grating and the angle of diffraction is smaller than 5°.

6. The device of claim 2, wherein the slit element is arranged at an entrance of the device.

7. The device of claim 1, wherein the light dispersing device comprises an optical path having a Littrow configuration.

8. The device of claim 7, further comprising:
at least one reflective grating and an optical configuration wherein the difference between the angle of incidence on the grating and the angle of diffraction is smaller than 10°.

9. The device of claim 7, further comprising:
at least one reflective grating and an optical configuration wherein the difference between the angle of incidence on the grating and the angle of diffraction is smaller than 5°.

10. The device of claim 7, wherein the slit element is arranged at an entrance of the device.

11. The device of claim 1, further comprising:
at least one reflective grating and an optical configuration wherein the difference between the angle of incidence on the grating and the angle of diffraction is smaller than 10°.

12. The device of claim 11, wherein the slit element is arranged at an entrance of the device.

13. The device of claim 1, further comprising:
at least one reflective grating and an optical configuration wherein the difference between the angle of incidence on the grating and the angle of diffraction is smaller than 5°.

14. The device of claim 13, wherein the slit element is arranged at an entrance of the device.

15. The device of claim 1, wherein the slit element is arranged at an entrance of the device.

16. The device according to claim 1, wherein the slit element is configured and disposed for adjusting a width of the slit for optical alignment.

17. A streak camera apparatus, comprising a photocathode for receiving an optical signal and for emitting electrons in response to the optical signal; deflection plates for deflecting the electrons when a timely varying voltage is applied to the deflection plates; and a screen for collecting electrons, the streak camera further comprising: a light dispersing device, wherein the light dispersing device comprises:
a light dispersing element dispersing electromagnetic radiation perpendicular to an axis defined by the light dispersing element; and
a slit element, the slit element having a slit for exposure to electromagnetic radiation, wherein the slit element is configured and disposed for turning the slit between at least two positions with respect to the axis defined by the light dispersing element such that each of a corresponding at least two portions of the electromagnetic radiation pass through the slit when the slit is in each of the corresponding at least two positions,
wherein the slit element is arranged such that each of the corresponding at least two portions of the electromagnetic radiation that pass through the slit is dispersed by the light dispersing element after passing through the slit.

18. The streak camera apparatus of claim 17, wherein an image plane at the exit side of the light dispersing device is positioned on the photocathode of the streak camera.

19. The streak camera apparatus of claim 17, wherein in a first position the slit is adjusted to influence the temporal resolution of the streak camera apparatus and in a second position the slit is adjusted to influence the spectral resolution of the streak camera apparatus and wherein the slit element is configured and disposed for adjusting the width of the slit for optical alignment.

20. The streak camera apparatus of claim 17, further comprising a temporal reference means comprising an optical delay line.

21. A method for detecting a temporally resolved electromagnetic spectrum with a streak camera apparatus, wherein the streak camera apparatus comprises a light dispersing device, wherein the light dispersing device comprises a slit element having a slit for exposure to electromagnetic radiation, wherein the slit element is configured and disposed for turning the slit between at least two positions, comprising:
positioning the slit element in a first position in which the slit is adjusted to influence the spectral resolution of the streak camera apparatus;
focussing electromagnetic radiation on the slit;
positioning the slit element in the second position in which the slit is adjusted to influence the temporal resolution of the streak camera apparatus;
adjusting the focussing of the electromagnetic radiation on the slit according to the desired temporal resolution.

22. The method of claim 21, further comprising aligning the streak camera apparatus with respect to electromagnetic radiation or components of an optical setup in at least one of the positions of the slit element.

23. The method of claim 21, further comprising changing the width of the slit of the slit element to influence the temporal or spectral resolution of the streak camera apparatus.

* * * * *